United States Patent
Wang et al.

(10) Patent No.: US 12,508,583 B2
(45) Date of Patent: Dec. 30, 2025

(54) METHOD FOR PRODUCING ENERGETIC GAS FROM CARBON DIOXIDE

(71) Applicant: NATIONAL CHENG KUNG UNIVERSITY, Tainan (TW)

(72) Inventors: Wei-Cheng Wang, Tainan (TW); Yung-Hsiang Yang, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 204 days.

(21) Appl. No.: 18/493,352

(22) Filed: Oct. 24, 2023

(65) Prior Publication Data

US 2025/0034060 A1     Jan. 30, 2025

(30) Foreign Application Priority Data

Jul. 24, 2023   (TW) ................ 112127609

(51) Int. Cl.
   *B01J 35/30*      (2024.01)
   *B01J 21/04*      (2006.01)
   (Continued)

(52) U.S. Cl.
   CPC ........... *B01J 35/393* (2024.01); *B01J 21/04* (2013.01); *B01J 23/755* (2013.01); *B01J 35/394* (2024.01); *B01J 37/0201* (2013.01); *B01J 37/0236* (2013.01); *B01J 37/088* (2013.01); *B01J 37/18* (2013.01); *C07C 1/12* (2013.01); *C07C 2521/04* (2013.01); *C07C 2523/755* (2013.01)

(58) Field of Classification Search
   CPC . C07C 1/12; C07C 2521/04; C07C 2523/755; B01J 21/04; B01J 23/755; B01J 35/393; B01J 35/394; B01J 37/0201; B01J 37/0236; B01J 37/088; B01J 37/18; B01J 35/30

USPC ........................................ 585/733
   See application file for complete search history.

(56) References Cited

U.S. PATENT DOCUMENTS
   2019/0344246 A1 * 11/2019 Mori .............. B01J 37/04

FOREIGN PATENT DOCUMENTS
   CN     102728386 A    10/2012
   CN     113368862 A     9/2021

OTHER PUBLICATIONS

Search Report appended to an Office Action, which was issued to Taiwanese counterpart application No. 112127609 by the TIPO on Oct. 4, 2024 with an English translation thereof.
   (Continued)

*Primary Examiner* — Prem C Singh
*Assistant Examiner* — Francis C Campanell
(74) *Attorney, Agent, or Firm* — Nixon & Vanderhye PC

(57) ABSTRACT

A method for producing an energetic gas from carbon dioxide includes the steps of: impregnating a plurality of alumina particles into a nickel-based aqueous solution to form a crude product, followed by subjecting the crude product to a drying treatment and then to a calcination treatment at a temperature ranging from 550° C. to 650° C., so as to obtain a supported catalyst; activating the supported catalyst with hydrogen, so as to obtain an activated supported catalyst; and subjecting hydrogen and carbon dioxide to a methanation reaction at a total gas hourly space velocity ranging from 4000 h$^{-1}$ to 5000 h$^{-1}$ in the presence of the activated supported catalyst, so as to form methane serving as an energetic gas.

7 Claims, 1 Drawing Sheet

(51) Int. Cl.
*B01J 23/755* (2006.01)
*B01J 37/02* (2006.01)
*B01J 37/08* (2006.01)
*B01J 37/18* (2006.01)
*C07C 1/12* (2006.01)

(56) References Cited

OTHER PUBLICATIONS

A. Erhan Aksoylu, et al, "Hydrogenation of carbon oxides using coprecipitated and impregnated Ni/A1203 catalysts", Applied Catalysis A: General, vol. 164, 1997, pp. 1-11.
Chae-Eun Yeo, et al, "Optimization of Operating Conditions for CO2 Methanation Process Using Design of Experiments", energies MDPI, vol. 14, Dec. 13, 2021, pp. 1-12.
J. Juan-Juan, et al, "Catalytic activity and characterization of Ni/Al2O3 and NiK/Al2O3 catalysts for CO2 methane reforming", Applied Catalysis A: General, vol. 264, 2004, pp. 169-174.

* cited by examiner

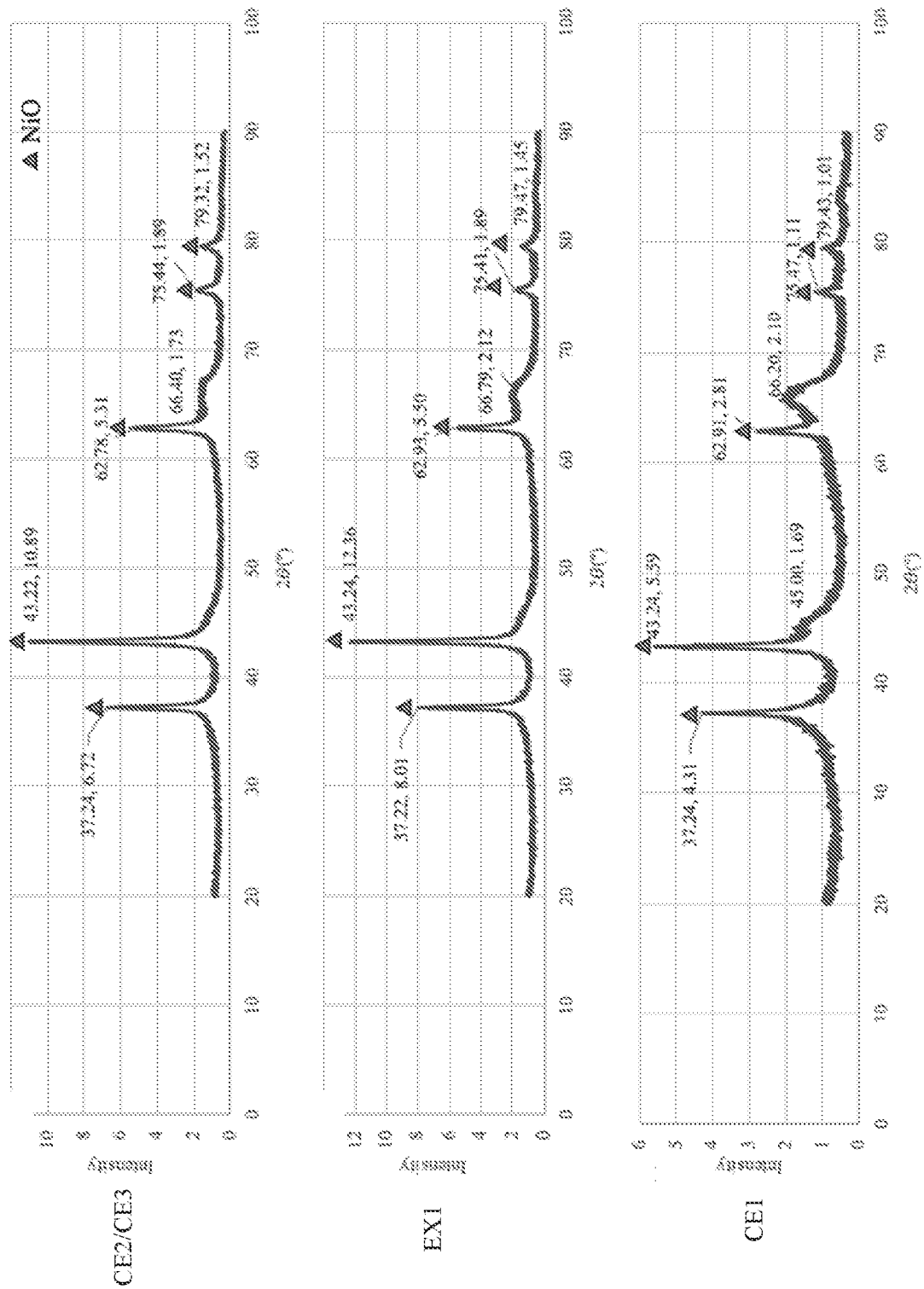

METHOD FOR PRODUCING ENERGETIC GAS FROM CARBON DIOXIDE

CROSS-REFERENCE TO RELATED APPLICATION

This application claims priority to Taiwanese Invention Patent Application No. 112127609, filed on Jul. 24, 2023, and incorporated by reference herein in its entirety.

FIELD

The present disclosure relates to a method for producing an energetic gas, and more particularly to a method for producing an energetic gas from carbon dioxide.

BACKGROUND

Carbon dioxide ($CO_2$) is one of the major greenhouse gases contributing to global warming. In order to mitigate the negative impacts of carbon dioxide on the environment, measures taken at present include reducing carbon dioxide emissions or reusing carbon dioxide, and production of energetic gas from carbon dioxide is one of the current trends in carbon dioxide reuse. The energetic gases are gases that can be used to produce energy. Common energetic gases such as methane can be used as fuel to produce electricity or heat.

CN 113368862 A discloses a carbon dioxide methanation catalyst and a method for preparing the same. The carbon dioxide methanation catalyst includes $\gamma$-$Al_2O_3$ serving as a carrier, nickel metal (Ni) serving as an active component, and europium (III) oxide serving as an auxiliary agent, and is used to catalyze the hydrogenation of carbon dioxide for synthesis of methane. The X-ray diffraction (XRD) pattern of the carbon dioxide methanation catalyst shows characteristic peaks of nickel (II) oxide and $\gamma$-$Al_2O_3$ but not europium (III) oxide, indicating that the europium (III) oxide is highly dispersed on a surface of the carbon dioxide methanation catalyst or exists in an amorphous form. With increasing addition of europium (III) oxide, intensities of characteristic peaks of nickel (II) oxide become weaker and peak shapes become broader, demonstrating that a mean particle size of nickel (II) oxide decreases and a dispersion of nickel (II) oxide increases, and hence can increase the catalytic activity of the carbon dioxide methanation catalyst.

In the examples of CN 113368862 A, the carbon dioxide methanation catalyst is subjected to a reduction reaction with a reducing gas ($H_2$:$N_2$=1:9) in a stainless steel reactor at a temperature of 500° C., followed by subjecting the carbon dioxide methanation catalyst to an activity test with a reaction gas ($CO_2$: $H_2$=4:1) switched from the reducing gas at a temperature ranging from 225° C. to 400° C., and subsequently the carbon dioxide conversion rates and methane yields are determined. The results show that when the nickel metal is present in an amount of 20% and the europium (III) oxide is present in an amount of 5%, based on the total mass of the support in the carbon dioxide methanation catalyst (i.e., the catalyst C in CN 113368862 A), the carbon dioxide conversion rate reaches 80.8% and the methane yield reaches 80.4% at a temperature of 275° C., and the carbon dioxide conversion rate reaches a maximum of 91.9% and the methane yield reaches 90.4% at a temperature of 325° C.

In addition, when the nickel metal is present in an amount of 20% without the europium (III) oxide, based on the total mass of the support in the carbon dioxide methanation catalyst (i.e., the catalyst F in CN 113368862 A), the carbon dioxide conversion rate only reaches 26.5% and the methane yield only reaches 26.7% at a temperature of 275° C., the carbon dioxide conversion rate reaches 58.9% and the methane yield reaches 58.5% at a temperature of 300° C., and the carbon dioxide conversion rate reaches a maximum of 88.2% and the methane yield reaches 87.8% at a temperature of 350° C. These results demonstrate that the addition of europium (III) oxide to the carbon dioxide methanation catalyst can significantly increase the carbon dioxide conversion rate and the methane yield below 300° C.

In spite of the aforesaid, there is still a need to develop an effective way for producing an energetic gas from carbon dioxide.

SUMMARY

Therefore, an object of the present disclosure is to provide a method for producing an energetic gas from carbon dioxide, which can alleviate at least one of the drawbacks of the prior art, and which has a high conversion rate of carbon dioxide and a high yield of methane serving as an energetic gas.

According to the present disclosure, the method includes the steps of:
(a) impregnating a plurality of alumina particles into a nickel-based aqueous solution to form a crude product, followed by subjecting the crude product to a drying treatment and then to a calcination treatment at a temperature ranging from 550° C. to 650° C., so as to obtain a supported catalyst;
(b) activating the supported catalyst with hydrogen, so as to obtain an activated supported catalyst; and
(c) subjecting hydrogen and carbon dioxide to a methanation reaction at a total gas hourly space velocity ranging from 4000 $h^{-1}$ to 5000 $h^{-1}$ in the presence of the activated supported catalyst, so as to form methane serving as an energetic gas.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 1 is a graph showing the X-ray diffraction (XRD) patterns of the supported catalysts of the experimental group 1 (i.e., EX1), and the comparative groups 1, 2, and 3 (i.e., CE1 to CE3).

DETAILED DESCRIPTION

For the purpose of this specification, it will be clearly understood that the word "comprising" means "including but not limited to", and that the word "comprises" has a corresponding meaning.

It is to be understood that, if any prior art publication is referred to herein, such reference does not constitute an admission that the publication forms a part of the common general knowledge in the art, in Taiwan or any other country.

Unless defined otherwise, all technical and scientific terms used herein have the meaning commonly understood by a person skilled in the art to which the present disclosure belongs. One skilled in the art will recognize many methods and materials similar or equivalent to those described herein, which could be used in the practice of the present disclosure.

Indeed, the present disclosure is in no way limited to the methods and materials described.

The present disclosure provides a method for producing an energetic gas from carbon dioxide, which includes the steps of:
- (a) impregnating a plurality of alumina particles into a nickel-based aqueous solution to form a crude product, followed by subjecting the crude product to a drying treatment and then to a calcination treatment at a temperature ranging from 550° C. to 650° C., so as to obtain a supported catalyst;
- (b) activating the supported catalyst with hydrogen, so as to obtain an activated supported catalyst; and
- (c) subjecting hydrogen and carbon dioxide to a methanation reaction at a total gas hourly space velocity ranging from 4000 $h^{-1}$ to 5000 $h^{-1}$ in the presence of the activated supported catalyst, so as to form methane serving as an energetic gas.

In certain embodiments, the alumina particles in step (a) have a crystal structure of $\gamma$-$Al_2O_3$. The $\gamma$-$Al_2O_3$ has advantages of easy dispersion, high specific surface area, and high temperature resistance, and hence is capable of conferring better catalytic activity and durability to the activated supported catalyst prepared in step (b). In certain embodiments, the alumina particles in step (a) have a mean particle size ranging from 3.0 mm to 3.2 mm, so that the activated supported catalyst prepared in step (b) has better catalytic activity, which is more favorable for subjecting the carbon dioxide to the methanation reaction, so as to form the methane.

As used herein, the term "nickel base" in the nickel-based aqueous solution refers to any compound that can be dissolved in water to provide nickel ions. An example of the nickel base may include, but is not limited to, nickel (II) nitrate. In certain embodiments, the nickel-based aqueous solution is obtained by dissolving nickel (II) nitrate hexahydrate [$Ni(NO_3)_2$:$6H_2O$] in water.

In step (a), the nickel-based aqueous solution infiltrates and adsorbs the plurality of alumina particles by means of an impregnation method, so as to form a solid product (i.e., the crude product). Operating temperature and duration of the step (a) can be flexibly adjusted according to the specifications of the alumina particles, an amount of the alumina particles, a concentration of the nickel-base in the nickel-based aqueous solution, and an amount of the nickel-based aqueous solution. In certain embodiments, in step (a), the alumina particles are impregnated into the nickel-based aqueous solution at a temperature ranging from 60° C. to 80° C. for 2 hours, so as to form the crude product. By virtue of performing step (a) at a temperature ranging from 60° C. to 80° C., the thus obtained crude product contains less water, which is more likely to cause moisture to evaporate during the impregnation process due to an influence of the temperature. In addition, by virtue of performing step (a) at a temperature ranging from 60° C. to 80° C. for 2 hours, the effect of the infiltration and absorption of the nickel-based aqueous solution onto the alumina particles can be optimized, so that the activated supported catalyst prepared in step (b) has better catalytic activity.

The purpose of subjecting the crude product to the drying treatment is to remove moisture therefrom. The condition of the drying treatment may include, but is not limited to, a drying temperature of 200° C. and a drying duration of 9 hours.

The purpose of subjecting the dried crude product to the calcination treatment is to oxidize the nickel base in the crude product so as to form a nickel (II) oxide (NiO), thereby obtaining the supported catalyst containing a nickel (II) oxide. When the calcination treatment is conducted at a temperature of lower than 550° C. or greater than 650° C., the subsequent carbon dioxide conversion rate and methane yield of the methanation reaction for the activated supported catalyst prepared in step (b) is not ideal. Therefore, in certain embodiments, in step (a), the calcination treatment is conducted at a temperature ranging from 550° C. to 650° C.

According to the present disclosure, the supported catalyst obtained in step (a) may include an alumina support and a nickel (II) oxide supported by the alumina support. In certain embodiments, the nickel (II) oxide has a mean particle size ranging from 40 nm to 45 nm, so that the activated supported catalyst prepared in step (b) has better catalytic activity.

According to the present disclosure, in step (b), the purpose of activating the supported catalyst with hydrogen is to reduce the nickel (II) oxide in the supported catalyst to form a nickel metal, thereby obtaining the activated supported catalyst containing a nickel metal and having catalytic activity. The condition of the activation of the supported catalyst may include, but is not limited to, a temperature of 500° C., a duration of 2 hours, and a flow rate of hydrogen of 1 L/min.

According to the present disclosure, the activated supported catalyst obtained in step (b) may include an alumina support and a nickel metal supported by the alumina support. In certain embodiments, the nickel metal supported by the alumina support is present in an amount ranging from 10 wt % to 20 wt %, based on the total weight of the activated supported catalyst, so that the activated supported catalyst has better catalytic activity.

According to the present disclosure, in step (c), if hydrogen and carbon dioxide are subjected to a methanation reaction at a total gas hourly space velocity of lower than 4000 $h^{-1}$ or greater than 5000 $h^{-1}$, the thus obtained carbon dioxide conversion rate and the methane yield is not ideal. Therefore, in certain embodiments, in step (c), the hydrogen and the carbon dioxide are subjected to the methanation reaction at a total gas hourly space velocity ranging from 4000 $h^{-1}$ to 5000 $h^{-1}$. In certain embodiments, a volume ratio of the hydrogen to the carbon dioxide in decimal form ranges from 4 to 5. In certain embodiments, the methanation reaction is conducted at a pressure of 1 atm and at a temperature ranging from 285° C. to 315° C.

The disclosure will be further described by way of the following examples. However, it should be understood that the following examples are solely intended for the purpose of illustration and should not be construed as limiting the disclosure in practice.

Examples

Example 1 (EX1)

The method for producing an energetic gas from carbon dioxide of the present disclosure was performed as follows.

In step (a), 18.2 g of nickel (II) nitrate hexahydrate was dissolved in 200 ml of deionized water, so as to obtain a nickel-based aqueous solution. A total of 20.4 g of multi-beaded $\gamma$-$Al_2O_3$ having a mean particle size of 3.175 mm (Manufacturer: Leobert International Ltd.; Model no.: spherical A000W6) was impregnated in the nickel-based aqueous solution at a temperature of 70° C. for 2 hours, followed by collecting the solid portion serving as a crude product. Next, the crude product was subjected to a drying treatment at a temperature of 200° C. for 9 hours, follow by conducting a calcination treatment at a temperature of 600° C. for 5 hours, so as to obtain a supported catalyst.

In step (b), 24 g of the supported catalyst was filled in the middle of a tubular reactor which was made of 316 stainless steel, and both ends of the tubular reactor were filled with glass wool, followed by a continuous flow of hydrogen through the tubular reactor at a flow rate of 1 L/min to activate the supported catalyst with the hydrogen at a temperature of 500° C. for 2 hours, so as to obtain an activated supported catalyst.

In step (c), the hydrogen and carbon dioxide were continuously transported into the tubular reactor filled with the activated supported catalyst, and were then subjected to a methanation reaction at a pressure of 1 atm (i.e., atmospheric pressure) and at a temperature of 300° C., with a volume ratio of the hydrogen to the carbon dioxide in decimal form of 4.5. In addition, the hydrogen and carbon dioxide were subjected to the methanation reaction at a total gas hourly space velocity of 4000 h$^{-1}$.

Comparative Examples 1 to 3 (CE1 to CE3)

The operating conditions for producing an energetic gas from carbon dioxide of CE1 to CE3 were similar to those of EX1, except that the calcination temperature in step (a) and the total gas hourly space velocity of the hydrogen and the carbon dioxide in step (c) were varied as shown in Table 1 below.

Property Evaluation

A. Measurement of Particle Size of Supported Catalyst

The supported catalyst of the respective one of EX1 and CE1 to CE3 was subjected to determination of particle size using a digital caliper (Manufacturer: Mitutoyo; Model no.: CD-6″ASX).

B. Measurement of Particle Size of Nickel (II) Oxide in Supported Catalyst

The supported catalyst of the respective one of EX1 and CE1 to CE3 was subjected to XRD analysis using an X-ray diffractometer (Manufacturer: Bruker; Model no.: D8D Plus-TXS), so as to obtain the result of the XRD analysis as shown in FIG. 1, followed by subjecting the result of the XRD analysis to Scherrer equation to calculate the particle size of the nickel (II) oxide in the supported catalyst.

C. Measurement of Pore Size, Pore Volume, and Surface Area of Supported Catalyst The supported catalyst of the EX1 was subjected to Brunauer-Emmett-Teller (BET) analysis using a multi-function analyzer (Manufacturer: Microtrac MRB; Model no.: BELSORP MAX), so as to determine pore size, pore volume, and surface area.

D. Calculation of Content of Nickel Metal in the Activated Supported Catalyst

The content of nickel metal (wt %) in the activated supported catalyst was calculated using the following Equation (1):

$$A = [B/(B + C)] \times 100\% \quad (1)$$

where A=content of nickel metal (wt %)
B=weight of nickel metal determined in each group
C=weight of alumina support (i.e., 20.4 g)

The nickel metal weight was calculated using the following Equation (2):

$$B = (D/E) \times F \times G \quad (2)$$

where B=weight of nickel metal
D=atomic mass of nickel metal (i.e., 58.7)
E=molecular weight of nickel (II) nitrate hexahydrate (i.e., 290.79)
F=concentration of nickel (II) nitrate hexahydrate (i.e., 98%)
G=weight of nickel (II) nitrate hexahydrate (i.e., 18.2 g)

E. Calculation of Carbon Dioxide Conversion Rate

The carbon dioxide conversion rate was calculated using the following Equation (3):

$$H = [(CO_{2,in} - CO_{2,out})/CO_{2,in}] \times 100\% \quad (3)$$

where H=carbon dioxide conversion rate (%)
$CO_{2,in}$=amount of carbon dioxide delivered to the tubular reactor filled with the activated supported catalyst determined in each group
$CO_{2,out}$=amount of carbon dioxide discharged from the tubular reactor determined in each group F. Calculation of Methane Selectivity The methane selectivity was calculated using the following Equation (4):

$$I = [CH_{4,out}/(CH_{4,out} + CO_{out} + \text{other } C_xH_y)] \times 100\% \quad (4)$$

where I=methane selectivity (%)
$CH_{4,out}$=amount of methane discharged from the tubular reactor determined in each group
$CO_{out}$=amount of carbon monoxide discharged from the tubular reactor determined in each group
other $C_xH_y$=amount of non-methane hydrocarbon (e.g., $C_2H_6$) discharged from the tubular reactor determined in each group In particular, the amount of $CO_{out}$ and the amount of other $C_xH_y$ were both 0 in the present disclosure.

G. Calculation of Methane Yield

The methane yield was calculated using the following Equation (5):

$$J = H \times I \quad (5)$$

where J=methane yield (%)
H=carbon dioxide conversion rate (%) determined in each group
I=methane selectivity (%) determined in each group Results

TABLE 1

|  |  | EX1 | CE1 | CE2 | CE3 |
|---|---|---|---|---|---|
| Step (a) | Calcination temperature (° C.) | 600 | 700 | 500 | 500 |
|  | Supported catalyst particle size (mm) | 3.5 | 3.5 | 3.5 | 3.5 |

TABLE 1-continued

|  |  | EX1 | CE1 | CE2 | CE3 |
|---|---|---|---|---|---|
|  | Nickel (II) oxide particle size in the supported catalyst (nm) | 43.40 | 29.20 | 39.74 | 39.74 |
|  | Supported catalyst pore size (nm) | 6.7 | — | — | — |
|  | Supported catalyst pore volume ($cm^3/g$) | 0.28 | — | — | — |
|  | Supported catalyst surface area ($m^2/g$) | 169 | — | — | — |
| Step (b) | Content of nickel metal in the activated supported catalyst (wt %) | 15 | 15 | 15 | 15 |
| Step (c) | Total gas hourly space velocity of the hydrogen and the carbon dioxide ($h^{-1}$) | 4000 | 4000 | 4000 | 5000 |
|  | Carbon dioxide conversion rate (%) | 92.84 | 59.85 | 80.78 | 78.18 |
|  | Methane selectivity (%) | 100 | 100 | 100 | 100 |
|  | Methane yield (%) | 92.84 | 59.85 | 80.78 | 78.18 |

Note:
"—" means not determined

Summarizing the results of the XRD analysis in FIG. 1 and the results shown in Table 1, it is clear that compared with the supported catalyst of CE1 to CE3, the nickel (II) oxide in the supported catalyst of EX1 had a higher characteristic peak intensity (i.e., with a higher content of the nickel (II) oxide), and a larger particle size. In addition, the difference between CE1 to CE2 and EX1 was in the calcination temperature in step (a) while the operating conditions in steps (b) and (c) were the same, whereas both the carbon dioxide conversion rate and the methane yield determined in EX1 were higher than those of CE1 to CE2. These results indicate that by controlling the calcination treatment at a temperature ranging from 550° C. to 650° C. in step (a), the activated supported catalyst can have better catalytic activity.

Moreover, as shown in Table 1, compared with the methods for producing an energetic gas from carbon dioxide of CE1 to CE3, in the method for producing an energetic gas from carbon dioxide of EX1, by controlling the calcination treatment at a temperature of 600° C. in step (a) and by subjecting the hydrogen and carbon dioxide to a methanation reaction at a total gas hourly space velocity of 4000 $h^{-1}$ and at a temperature of 300° C. in step (c), the carbon dioxide conversion rate reached 92.84% and the methane yield reached as high as 92.84%.

In summary, it is clear that in the method for producing an energetic gas from carbon dioxide of the present disclosure, the supported catalyst is obtained by controlling the calcination treatment at a temperature ranging from 550° C. to 650° C. in step (a), so that the nickel (II) oxide in the supported catalyst has high content and large particle size, and subsequently the activated supported catalyst prepared in step (b) has better catalytic activity, and in combination with subjecting the hydrogen and the carbon dioxide to the methanation reaction at a total gas hourly space velocity ranging from 4000 $h^{-1}$ to 5000 $h^{-1}$ in step (c), a high conversion rate of carbon dioxide and a high yield of methane serving as an energetic gas can be achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for producing methane from carbon dioxide, comprising the steps of:
    (a) impregnating a plurality of alumina particles into a nickel-based aqueous solution to form a crude product, followed by subjecting the crude product to a drying treatment and then to a calcination treatment at a temperature ranging from 550° C. to 650° C., so as to obtain a supported catalyst;
    (b) activating the supported catalyst with hydrogen, so as to obtain an activated supported catalyst; and
    (c) subjecting hydrogen and carbon dioxide to a methanation reaction at a total gas hourly space velocity ranging from 4000 $h^{3\ 1}$ to 5000 $h^{-1}$ in the presence of the activated supported catalyst, so as to form methane;
    wherein in step (a), the supported catalyst includes an alumina support and a nickel (II) oxide supported by the alumina support, the nickel (II) oxide having a mean particle size ranging from 40 nm to 45 nm.

2. The method as claimed in claim 1, wherein in step (a), the alumina particles have a crystal structure of $\gamma$-$Al_2O_3$.

3. The method as claimed in claim 1, wherein in step (a), the alumina particles have a mean particle size ranging from 3.0 mm to 3.2 mm.

4. The method as claimed in claim 1, wherein in step (a), the nickel-based aqueous solution is obtained by dissolving nickel (II) nitrate hexahydrate in water.

5. The method as claimed in claim 1, wherein in step (a), the alumina particles are impregnated in the nickel-based aqueous solution at a temperature ranging from 60° C. to 80° C. for 2 hours, so as to form the crude product.

6. The method as claimed in claim 1, wherein in step (b), the activated supported catalyst includes the alumina support and a nickel metal supported by the alumina support, the nickel metal supported by the alumina support being present in an amount ranging from 10 wt % to 20 wt %, based on the total weight of the activated supported catalyst.

7. The method as claimed in claim 1, wherein in step (c), the methanation reaction is conducted at a pressure of 1 atm and at a temperature ranging from 285° C. to 315° C.

* * * * *